United States Patent
Missall et al.

(10) Patent No.: US 10,232,682 B2
(45) Date of Patent: Mar. 19, 2019

(54) METHOD FOR DISPLAYING THE STATUS OF A HEATING OR AIR CONDITIONING DEVICE OF A VEHICLE AND HEATING OR AIR CONDITIONING DEVICE FOR A VEHICLE

(71) Applicant: VOLKSWAGEN AKTIENGESELLSCHAFT, Wolfsburg (DE)

(72) Inventors: Markus Missall, Braunschweig (DE); Stefan Schmidtke, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 183 days.

(21) Appl. No.: 14/442,997

(22) PCT Filed: Nov. 15, 2013

(86) PCT No.: PCT/EP2013/073932
§ 371 (c)(1),
(2) Date: May 14, 2015

(87) PCT Pub. No.: WO2014/079778
PCT Pub. Date: May 30, 2014

(65) Prior Publication Data
US 2015/0283881 A1    Oct. 8, 2015

(30) Foreign Application Priority Data
Nov. 20, 2012  (DE) .......... 10 2012 022 590

(51) Int. Cl.
*B60H 1/00* (2006.01)
*B60H 1/22* (2006.01)

(52) U.S. Cl.
CPC ..... *B60H 1/00985* (2013.01); *B60H 1/00657* (2013.01); *B60H 2001/2234* (2013.01)

(58) Field of Classification Search
CPC ............ B60H 1/00985; B60H 1/00657
USPC .......................................... 165/202
See application file for complete search history.

(56) References Cited

U.S. PATENT DOCUMENTS

| | | | | |
|---|---|---|---|---|
| 4,170,259 A | * | 10/1979 | Kumagai | B60H 1/00985 165/11.1 |
| 2012/0282913 A1 | * | 11/2012 | Kaindl | B60H 1/00657 455/420 |

FOREIGN PATENT DOCUMENTS

| | | |
|---|---|---|
| DE | 19941948 A1 | 3/2001 |
| DE | 102006048367 A1 | 4/2008 |
| DE | 102008017051 A1 | 10/2009 |
| DE | 102008056209 A1 | 1/2010 |
| DE | 102011112680 A1 | 5/2012 |

(Continued)

OTHER PUBLICATIONS

DE102008017051 Machine Translation.*

(Continued)

*Primary Examiner* — Travis C Ruby
(74) *Attorney, Agent, or Firm* — Barnes & Thornburg LLP

(57) ABSTRACT

A method for displaying the status of a heating or air conditioning device of a vehicle wherein a graphical object that depicts the vehicle is displayed by a display device of the vehicle, the status of the heating or air conditioning device is detected, and different statuses of the heating or air conditioning device are displayed by the display device by different depictions of vehicle surfaces. Also disclosed is a heating or air conditioning device for performing the method.

15 Claims, 3 Drawing Sheets

(56) References Cited

FOREIGN PATENT DOCUMENTS

JP      54095430         7/1979
WO     WO2005/043483   *  5/2005   ............. G08C 19/00

OTHER PUBLICATIONS

Search Report for German Patent Application No. 10 2012 022 590.3; dated Sep. 3, 2013.
Search Report for International Patent Application No. PCT/EP2013/073932; dated Jan. 27, 2014.

* cited by examiner

METHOD FOR DISPLAYING THE STATUS OF A HEATING OR AIR CONDITIONING DEVICE OF A VEHICLE AND HEATING OR AIR CONDITIONING DEVICE FOR A VEHICLE

PRIORITY CLAIM

This patent application is a U.S. National Phase of International Patent Application No. PCT/EP2013/071513, filed 15 Oct. 2013, which claims priority to German Patent Application No. 10 2012 021 436.7, filed 30 Oct. 2012, the disclosures of which are incorporated herein by reference in their entirety.

SUMMARY

Illustrative embodiments relate to a method for displaying the status of a heating or air conditioning device of a vehicle. In addition, disclosed embodiments relate to a heating or air conditioning device for a vehicle having a control device for controlling the heating or air conditioning device and a display device for displaying statuses of the heating or air conditioning device.

Illustrative embodiments provide a method and a heating or air conditioning device in which the user can easily and intuitively perceive the status of the heating or air conditioning device.

BRIEF DESCRIPTION OF THE DRAWINGS

The invention will now be explained on the basis of an exemplary embodiment and with reference to the figures, in which.

DETAILED DESCRIPTION OF THE DISCLOSED EMBODIMENTS

Figure 1:
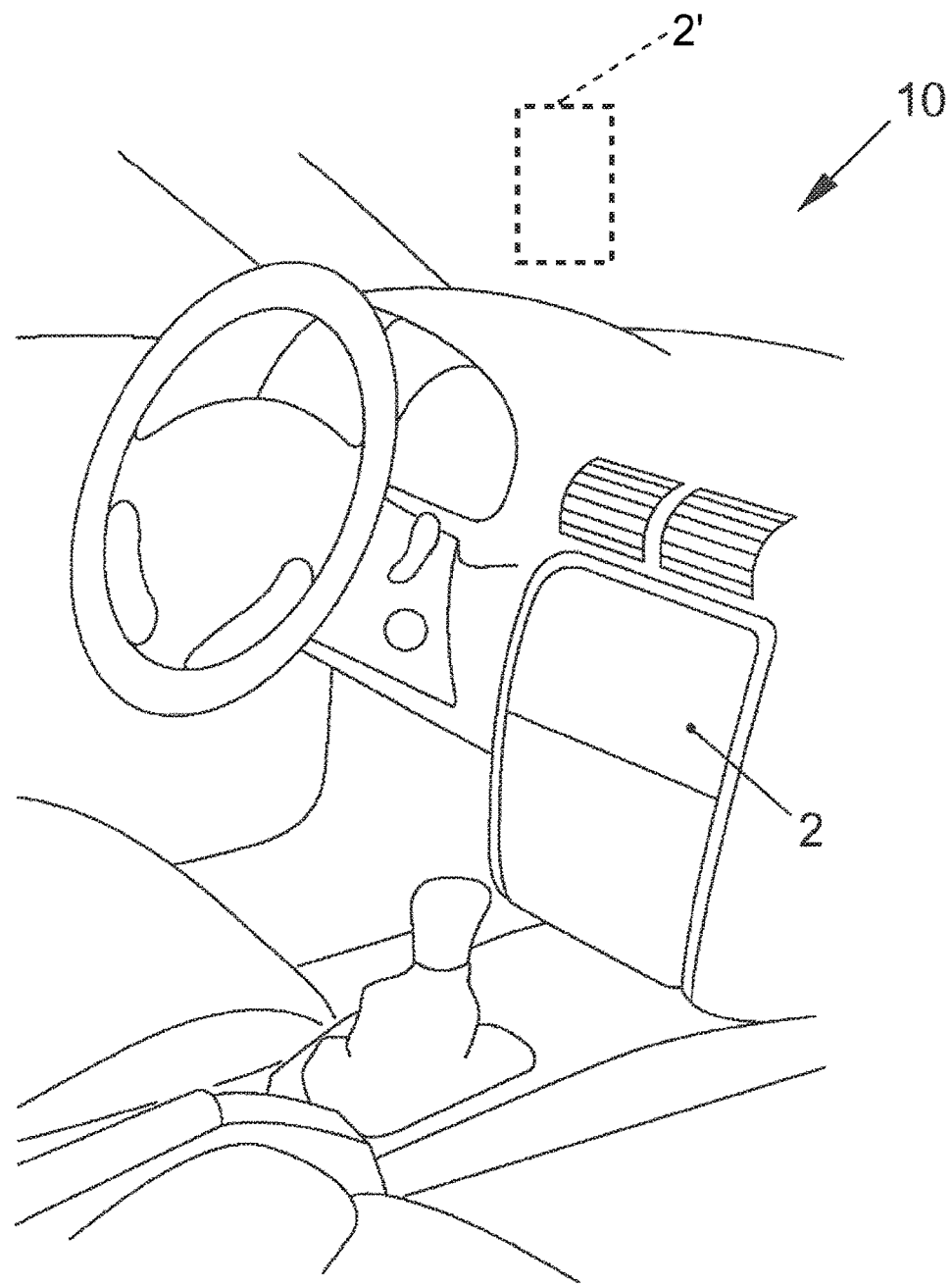
FIG. 1 shows a schematic view of a vehicle having an exemplary embodiment of the heating or air conditioning device, which is embodied as a stationary-state air conditioning system or stationary-state heating system.

In the method, a graphic object which represents the vehicle is displayed by a display device of the vehicle. In addition, the status of the heating or air conditioning device is detected and various statuses of the heating or air conditioning device are displayed by the display device by means of different representations of vehicle surfaces of the represented vehicle.

In the method, the user can advantageously very easily and intuitively perceive the status of the heating or air conditioning device, since this status is displayed by means of representations of vehicle surfaces of a graphic object which represents the vehicle itself.

According to refinements of the method, various statuses of the heating or air conditioning device can be displayed by the display device by means of different representations of vehicle windowpanes, in particular by means of representations of vehicle windowpanes in different colors. As a result, it is advantageously very easily and intuitively possible to perceive the detected status of the heating or air conditioning device.

The statuses of the heating or air conditioning device can comprise the status of a switched-on heating or air conditioning device, the status of a switched-off heating or air conditioning device and/or the status of a heating or air conditioning device which is switched off but is programmed to switch on automatically at a later time. In addition, the statuses of the heating or air conditioning device can comprise the status of a heating or air conditioning device which is switched off but which can receive in a wireless fashion signals for switching on.

According to at least one disclosed embodiment, the heating or air conditioning device is a device for stationary-state air conditioning.

In the heating or air conditioning device, the control device actuates the display device in such a way that various statuses of the heating or air conditioning device are displayed by the display device by means of different representations of vehicle surfaces of a graphic object which represents the vehicle. The control of the heating or air conditioning device and of the display device can be carried out here by a single control device or by a plurality of control units which constitute the control device in this case.

The heating or air conditioning device executes the disclosed method. It, therefore, has the same advantages as the method. The heating or air conditioning device may be a stationary-state air conditioning system or stationary-state heating system of the vehicle.

The display device of the heating or air conditioning device can be a display device of a mobile apparatus, for example, of a mobile radio apparatus or of a remote control system, with the result that a person who is operating or programming the heating or air conditioning device remotely can quickly obtain an overview of the current status of the heating or air conditioning device.

In addition, a vehicle, in particular a motor vehicle, is made available with the heating or air conditioning device described above.

Figure 2:
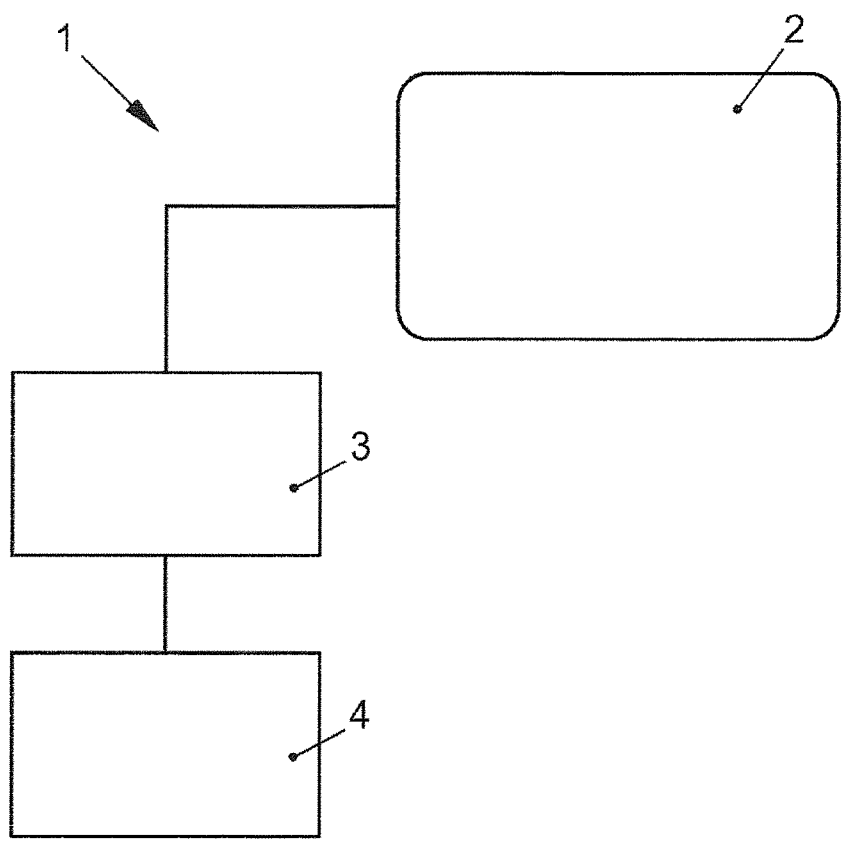
FIG. 2 shows the design of the exemplary embodiment of the heating or air conditioning device which is embodied as a stationary-state air conditioning system or stationary-state heating system.

The exemplary embodiment of the stationary-state air conditioning system or stationary-state heating system 1 will be described with reference to FIGS. 1 and 2:

The stationary-state air conditioning system or stationary-state heating system 1 is integrated into a vehicle 10. The system comprises a display device 2, 2' which a vehicle occupant can view from the passenger compartment of the vehicle 10. For example, the display device 2 is accommodated in the central console of the vehicle 10. A further possibility is that the display device 2' is the display of a mobile apparatus, wherein there is the possibility here that the status of the stationary-state air conditioning system or stationary-state heating system can also be determined outside the vehicle.

The display device 2 is coupled to a control device 3. Depending on the embodiment of the stationary-state air conditioning system or stationary-state heating system 1, this can be done in a hard-wired fashion or by means of a wireless communication link. The control device 3 generates graphics data for the display on a display surface of the display device 2. In addition, the control device 3 is coupled to a stationary-state air conditioning system or stationary-state heating system 4, which is known per se, of the vehicle 10. The passenger compartment of the vehicle 10 can be heated or ventilated or cooled by means of the stationary-state air conditioning system or stationary-state heating system 4. By means of the control device 3, it is also possible to program in advance the times at which the passenger compartment of the vehicle 10 is to be heated or cooled. The stationary-state air conditioning system or stationary-state heating system 4 then switches on and off again at the programmed times.

The control device 3 makes available, via the display device 2, a graphic user interface for the control and programming of the stationary-state air conditioning system or stationary-state heating system 4. By means of this graphic user interface, a user can switch the stationary-state air conditioning system or stationary-state heating system 4 on and off and program the stationary-state air-conditioning system or stationary-state heating system 4 using input means which are known per se, such as, for example, a touch-sensitive surface on the display surface of the display device 2 or using a remote mechanical operator control element. The status of the stationary-state air conditioning system or stationary-state heating system 4 is displayed here by the display device 2, as is explained below on the basis of an exemplary embodiment of the method with reference to FIGS. 3 and 4:

For the display of the status of the stationary-state air conditioning system or stationary-state heating system 4, the control device 3 generates graphics data for a display on the display surface of the display device 2, in which display a graphic object 5 which represents the vehicle is displayed. Furthermore, for example the control device 3 detects the status of the stationary-state air conditioning system or stationary-state heating system 4. Subsequently, various statuses of the stationary-state air conditioning system or stationary-state heating system 4 are displayed by means of different representations of vehicle surfaces using the control device 3 and the display device 2. The vehicle surfaces are the vehicle windowpanes 6 in the present exemplary embodiment.

Figure 3:
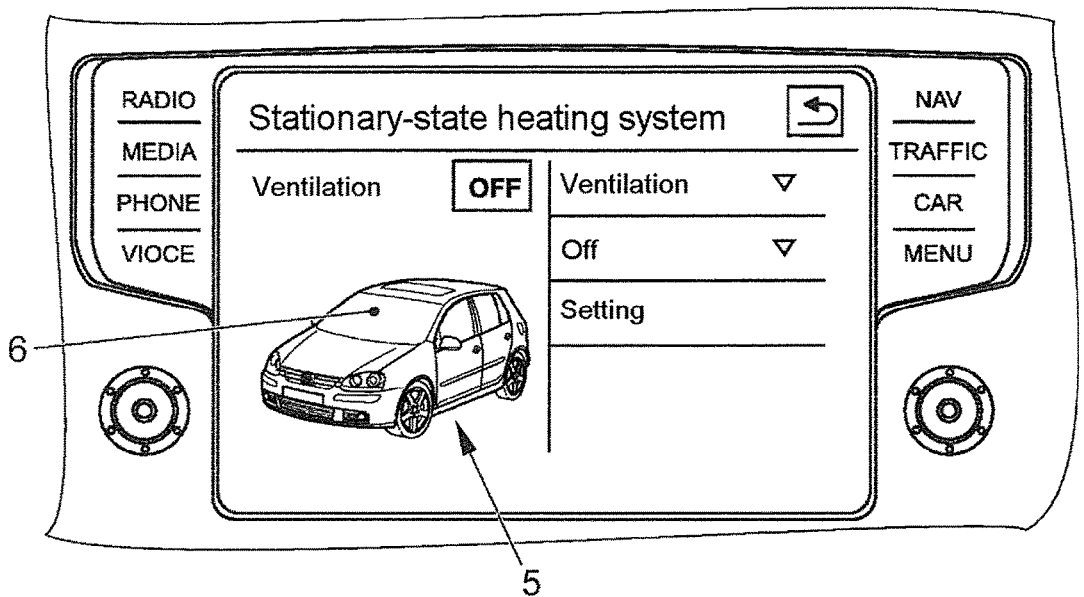
FIGS. 3 and 4 show displays which have been generated by an exemplary embodiment of the method.

If the control device 3 has detected that the stationary-state air conditioning system or stationary-state heating system 4 is switched off and there is also no programming present according to which the stationary-state air conditioning system or stationary-state heating system switches on automatically at a later time, the vehicle windowpanes 6 are represented in blue on the graphic object 5. This is shown in FIG. 3. If the stationary-state air conditioning system or stationary-state heating system has a ventilation function or cooling function, the switched-on or programmed ventilation function or cooling function can be represented in this way.

Figure 4:
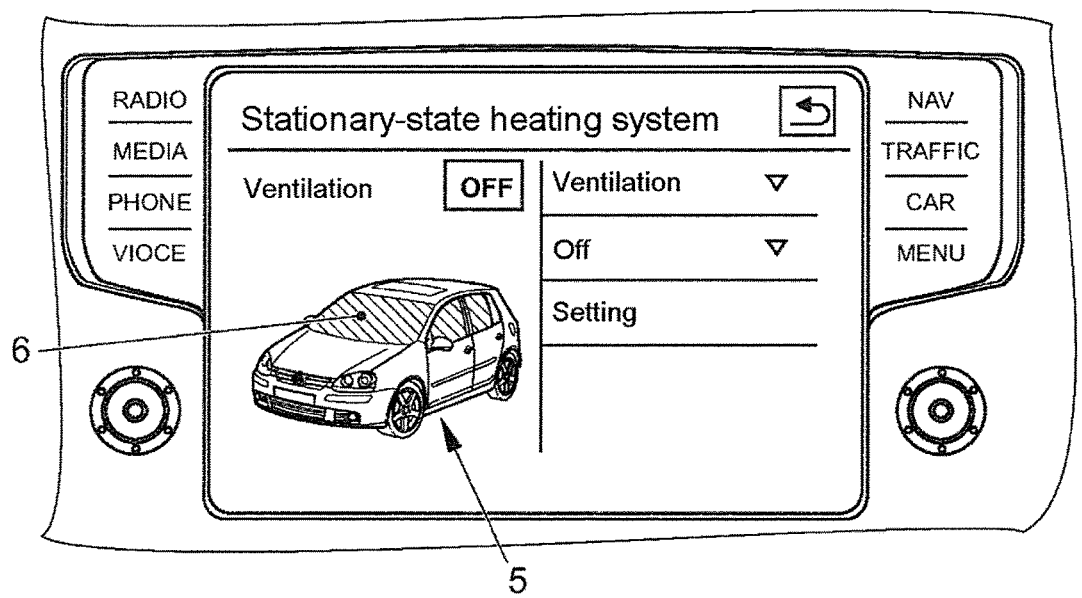

If, on the other hand, the control device 3 detects that the stationary-state air conditioning system or stationary-state heating system 4 has been programmed in such a way that it switches on automatically at a later time, the vehicle windowpanes 6 of the graphic object 5 of the vehicle 10 are represented in red. This is represented in FIG. 4 by hatching. The user can in this way recognize quickly and intuitively that the stationary-state heating system is currently switched off but has been programmed to switch on automatically at a later time.

Furthermore it is possible also to represent further statuses of the stationary-state air conditioning system or stationary-state heating system 4 by means of further colors or color shading. For example, the vehicle windowpanes 6 of the graphic object 5 can be colored dark red if the stationary-state air conditioning system or stationary-state heating system 4 is switched on at that moment. The vehicle windowpanes 6 of the graphic object 5 can, for example, be colored orange if the stationary-state air conditioning system or stationary-state heating system 4 is switched off but can receive in a wireless fashion signals for switching on. In this case, the stationary-state air conditioning system or stationary-state heating system 4 is in a state of rest in which it can, however, be switched on by the reception of a radio signal. The user can also perceive this status quickly and intuitively as a result of the coloring of the vehicle windowpanes 6.

The wireless signals by means of which the stationary-state air conditioning system or stationary-state heating system 4 can be switched on can be, for example, radio signals which are transmitted via a mobile radio network to a mobile radio interface of the vehicle 10. In addition, the radio signals can be transmitted via a wireless network such as a WLAN.

DE 199 41 948 A1 discloses a display and operator control unit for a stationary-state heating system in a motor vehicle. The display unit is embodied in this case as an on-board monitor of a multifunctional infotainment system.

LIST OF REFERENCE NUMBERS

1 Stationary-state air conditioning system or stationary-state heating system
2 Display device
3 Control device
4 Heating or air conditioning device
5 Graphic object
6 Vehicle surfaces, vehicle windowpanes
10 Vehicle

The invention claimed is:

1. A method for displaying the status of a heating or air conditioning device of a vehicle, the method comprising:
   displaying, on a display device, a graphical representation of the vehicle including exterior surfaces of the vehicle;
   detecting the status of the heating or air conditioning device; and
   displaying, on the display device as part of the graphical representation of the vehicle, at least one vehicle window pane among the exterior surfaces, and indicating a programmed status of heating or air conditioning device by shading of at least one of the exterior surfaces including the at least one vehicle window pane, wherein indicating a programmed status includes a first status having a first shading of the at least one vehicle window pane and a second status having another shading of the at least one vehicle window pane,
   wherein the first and second statuses of the heating or air conditioning device comprise a programmed status of a heating or air conditioning device which is switched off but which is programmed to switch on automatically at a later time.

2. The method of claim 1, wherein various statuses of the heating or air conditioning device are displayed by the display device by different shading of vehicle windowpanes.

3. The method of claim 1, wherein various statuses of the heating or air conditioning device are displayed by the display device by shading of vehicle windowpanes in different colors.

4. The method of claim 1, wherein the statuses of the heating or air conditioning device comprise the status of a switched-on heating or air conditioning device.

5. The method of claim 1, wherein the statuses of the heating or air conditioning device comprise the status of a switched-off heating or air conditioning device.

6. The method of claim 1, wherein the statuses of the heating or air conditioning device comprise the status of a heating or air conditioning device which is switched off but which can wirelessly receive signals for switching on.

7. The method of claim 1, wherein the heating or air conditioning device is a stationary-state air conditioning device of the vehicle.

8. The method of claim 1, further comprising switching on the heating or air conditioning device at the predetermined programmed times.

9. The method of claim 1, wherein the at least one vehicle window pane includes at least two vehicle window panes, and indicating the first status includes displaying the at least two vehicle window panes having the first shading.

10. A heating or air conditioning device for a vehicle, the heating or air conditioning device comprising:
   a control device for controlling the heating or air conditioning device; and
   a display device for displaying statuses of the heating or air conditioning device,
   wherein the control device actuates the display device such that various statuses of the heating or air conditioning device are displayed by the display device by depicting different shading of of a graphic object which represents vehicle windowpanes of the vehicle,
   wherein the control device actuates the display device such that various statuses of the heating or air conditioning device are displayed by the display device by shading of vehicle windowpanes in different colors,
   wherein the various statuses include first and second statuses each indicated by different color of the vehicle windowpanes, the first status representing the heating or air conditioning device being switched off but programmed to switch on automatically at a later time.

11. The heating or air conditioning device of claim 10, wherein the heating or air conditioning device is a stationary-state heating system of the vehicle.

12. The heating or air conditioning device of claim 10, wherein the display device is a display device of a mobile apparatus.

13. The heating or air conditioning device of claim 10, wherein the display device is a display of a mobile apparatus that can be arranged outside of the vehicle to display the different representations of vehicle surfaces.

14. A vehicle having a heating or air conditioning device, the heating or air conditioning device comprising:
   a control device for controlling the heating or air conditioning device; and
   a display device for displaying statuses of the heating or air conditioning device,
   wherein the control device actuates the display device such that various statuses of the heating or air conditioning device are displayed by the display device by depicting different representations of vehicle surfaces of a graphic object which represents the vehicle,
   wherein the control device is programed in advance to have predetermined programmed times to operate the heating or air conditioning device, wherein the control device switches on the heating or air conditioning device at the predetermined programmed times,
   wherein the display device is a display of a mobile apparatus that can be arranged outside of the vehicle to display the different representations of vehicle windowpanes, and the display depicts a first representation of vehicle windowpanes indicating that the heating or air conditioning device is not switched on and another representation of exterior vehicle surfaces indicating that the heating or air conditioning device is not switched on but is arranged to automatically switch on at the programmed times to provide a quick and intuitive perception of heating or air conditioning device status.

15. The method of claim 14, wherein the exterior surfaces include vehicle windowpanes and the various statuses of the heating or air conditioning device are indicated on the display device by shading of vehicle windowpanes in different colors.

* * * * *